(12) United States Patent
Goto

(10) Patent No.: US 7,548,687 B2
(45) Date of Patent: Jun. 16, 2009

(54) FOCUS DETECTING APPARATUS AND OPTICAL DEVICE

(75) Inventor: Hisashi Goto, Tokyo (JP)

(73) Assignee: Olympus Corporation, Tokyo (JP)

( * ) Notice: Subject to any disclaimer, the term of this patent is extended or adjusted under 35 U.S.C. 154(b) by 627 days.

(21) Appl. No.: 11/104,551

(22) Filed: Apr. 13, 2005

(65) Prior Publication Data

US 2005/0231720 A1 Oct. 20, 2005

(30) Foreign Application Priority Data

Apr. 16, 2004 (JP) ............................. 2004-121823

(51) Int. Cl.
*G02B 7/28* (2006.01)
(52) U.S. Cl. .................................................. 396/114
(58) Field of Classification Search ................. 396/114,
396/90, 119, 124, 141, 148, 343, 111, 89,
396/268, 272, 273; 399/38, 45; 353/33;
348/E9.001, E90.12, E9.025, E9.027, 343–345;
356/399, 687, 629; 359/630, 618, 629
See application file for complete search history.

(56) References Cited

U.S. PATENT DOCUMENTS

| | | | |
|---|---|---|---|
| 5,109,154 A | 4/1992 | Higashihara et al. | |
| 5,424,528 A * | 6/1995 | Goto | 250/201.8 |
| 5,839,001 A | 11/1998 | Ohtaka et al. | |
| 6,175,692 B1 * | 1/2001 | Onoda et al. | 396/104 |
| 6,424,805 B2 * | 7/2002 | Ohsawa | 396/50 |

FOREIGN PATENT DOCUMENTS

| | | |
|---|---|---|
| JP | 2-886865 | 2/1999 |
| JP | 2001-141980 | 5/2001 |
| JP | 3-363683 | 10/2002 |

* cited by examiner

*Primary Examiner*—Reena Aurora
(74) *Attorney, Agent, or Firm*—Kenyon & Kenyon LLP

(57) ABSTRACT

In a camera of the invention, during focus detection, luminous flux from an object is transmitted by a main mirror via an imaging lens, and then, is reflected by a reflection face of a sub-mirror. The reflected luminous flux is reflected by the main mirror, passes through a field stop, and is reflected by a guide mirror. The luminous flux reflected by this guide mirror is incident on a photoelectric converter element through a diaphragm and a refocusing lens. The luminous flux reflected by the main mirror reaches an eyepiece lens through a focusing glass and a pentaprism. During imaging, the main mirror and the sub-mirror are retracted from the imaging optical path. The luminous flux having passed through the imaging lens is guided to an image pickup device via an infrared filter and a low-pass filter.

19 Claims, 10 Drawing Sheets

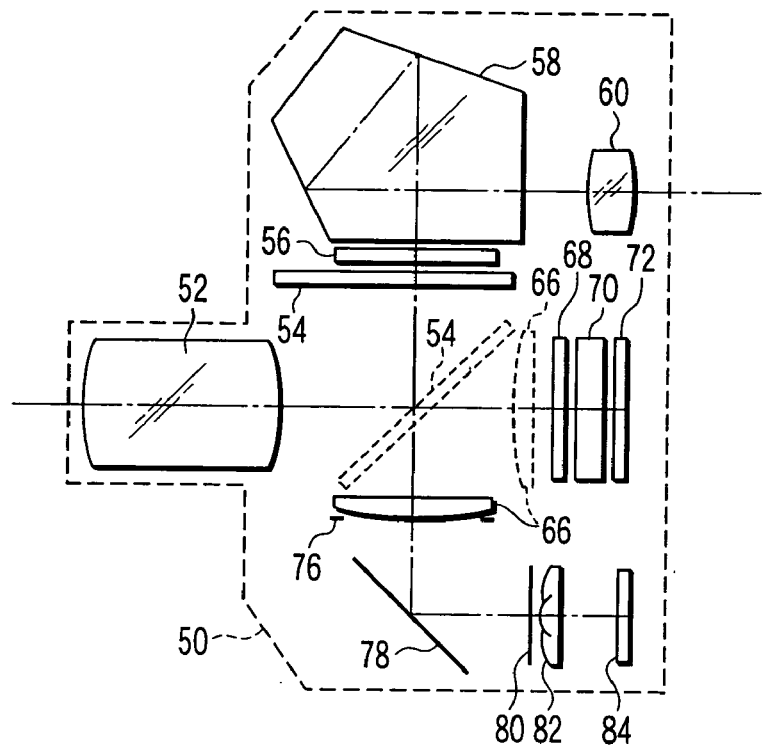
F I G. 2C
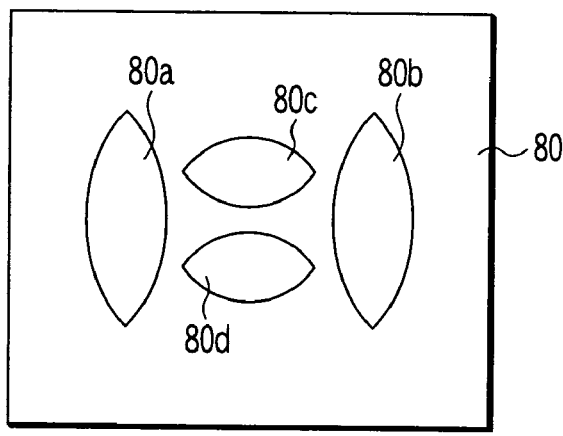
F I G. 3

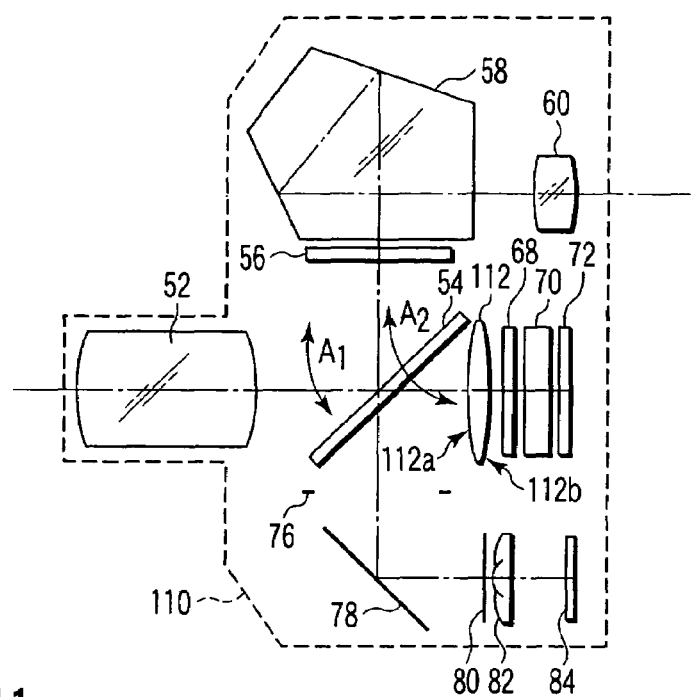
F I G. 11
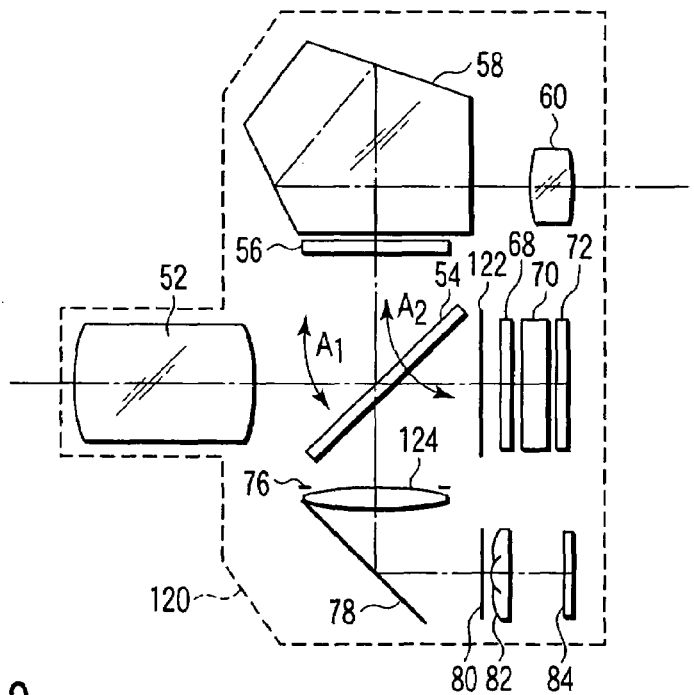
F I G. 12

FOCUS DETECTING APPARATUS AND OPTICAL DEVICE

CROSS-REFERENCE TO RELATED APPLICATIONS

This application is based upon and claims the benefit of priority from prior Japanese Patent Application No. 2004-121823, filed on Apr. 16, 2004, the entire contents of which are incorporated herein by reference.

BACKGROUND OF THE INVENTION

1. Field of the Invention

The present invention relates to a focus detecting apparatus and an optical device, and more particularly, to improvement of a camera having the focus detecting apparatus.

2. Description of the Related Art

Conventionally, it has been well known that an image formed by an imaging lens of an optical device is split into two parts by an image refocusing optical system, and the two parts are reformed on a photoelectric converter element array. Then, there have been proposed a number of focus detecting optical systems for detecting displacement of these two parts, thereby carrying out focus detection. Among these proposals, for example, a technique of detecting focus in a particularly wide screen range is disclosed in Jpn. Pat. Appln. KOKAI Publication No. 2001-141980, Jpn. Pat. No. 3363683, and Jpn. Pat. No. 2886865.

In Jpn. Pat. No. 2001-141980 and Jpn. Pat. No. 3363683 described previously, there is described an optical device for allocating a condenser lens function of a focus detecting system in the vicinity of a sub-mirror to reduce size.

In addition, in Jpn. Pat. No. 2886865 described previously, there is described a technique of attempting to expand a focus detecting region by configuring a condenser lens having different optical axes between a center portion and a peripheral portion.

FIGS. 1A to 1C are views showing layouts of an observation optical system and an image pickup optical system which represent the relationship between the size of such a conventional focus detecting range and the size of a sub-mirror.

Although a digital still single-lens reflex camera and a sub-mirror having a flat face have been illustrated for simplification of explanation, this illustration is basically applicable to a sub-mirror acting as a lens or in another optical device as well.

FIG. 1A is a view showing an example of an optical device 10A having a narrow focus detecting range; FIG. 1B is a view showing an example of an optical device 10B having a middle focus detecting range; and FIG. 1C is a view showing an example of an optical device 10C whose focus detecting range is substantially identical to the viewing field (imaging range) of the optical device.

A light beam from an object (not shown) is reflected by a main mirror 14 via an imaging lens 12, and the reflected light beam is guided to an eyepiece optical system 20 via a focusing glass 16 and a pentaprism 18. In addition, luminous flux having been transmitted by the main mirror 14 is reflected downward in FIGS. 1A to 1C by a foldable sub-mirror 24 mounted at the rear of the main mirror 14. Then, the luminous flux reflected by the sub-mirror 24 is guided to a photoelectric converter element 36 incorporated in a focus detecting apparatus. The luminous flux incident into the focus detecting apparatus is reflected by a mirror 30 via a field stop 26 and a condenser lens 28, and the reflected luminous flux is guided to the photoelectric converter element 36 through a diaphragm 32 and a re-imaging lens 34.

In addition, an infrared filter 40, a low-pass filter 42, and an image pickup device 44 are allocated at the rear of the main mirror 14 and the sub-mirror 24. The main mirror 14 and the sub-mirror 24 are retracted from the optical path during imaging so that luminous flux from an object (not shown) is guided to the image pickup device 44 via the infrared filter 40 and the low-pass filter 42.

Here, in an example of the optical device 10A shown in FIG. 1A, the optical device having a narrow focus detecting range "a", the device can be configured smoothly without any problem. However, in the optical device 10B shown in FIG. 1B, the optical device having a middle focus detecting range "b", a restriction on configuration occurs in the reflection direction of the sub-mirror 24 or when the main mirror 14 and the sub-mirror 24 are retracted during imaging.

Further, in the case of the optical device 10C shown in FIG. 1C in which the focus detecting range "c" is substantially identical to the viewing field (imaging range) of the optical device, the position of the main mirror 14 is greatly distant from the primary image focusing face in this single-lens reflex camera.

BRIEF SUMMARY OF THE INVENTION

The present invention has been made in order to solve the foregoing problem. Therefore, it is an object of the present invention to provide a focus detecting apparatus and an optical device which are compact and which enable a wide focus detecting range.

Therefore, a first aspect of the present invention provides a focus detecting apparatus which acquires an optical intensity distribution caused by a plurality of luminous fluxes passed through different regions of an objective lens at a photoelectric converter section, and detects a phase difference of an output signal which represents the acquired optical intensity distribution to carry out focus detection, the apparatus comprising:

a first reflection member which reflects luminous fluxes passed through the different regions of the objective lens, respectively;

a second reflection member which reflects the luminous fluxes each reflected by the first reflection member in a direction which is different from an incident direction of the luminous fluxes;

a re-imaging optical member which guides the luminous fluxes reflected by the second reflection member to the photoelectric converter section.

A second aspect of the present invention provides an optical device comprising:

an objective lens which guides a luminous flux from an object;

a first reflection member movably supported at an observation position obtained as a state of observing the object and at a retracted position obtained as a state retracted from an optical path, the first reflection member reflecting a luminous flux from the objective lens;

a second reflection member which is movably supported at the observation position and the retracted position, and reflects a part of the luminous flux from the objective lens in a first direction and transmits the luminous flux to the first reflection member when the reflection members are set at the observation position, and reflects the luminous flux reflected by the first reflection member in a second direction which is different from the first direction;

an observation optical system to observe the object by using the part of the luminous flux from the objective lens reflected by the second reflection member; and a focus detecting section which acquires an optical intensity distribution based on the luminous flux reflected by the second reflection member and detects a phase difference of an output signal which represents the optical intensity distribution to carry out focus detection.

At the observation position herein, the first and second reflection members may be set at any place in the optical device if they are in a state capable of observing an object. Similarly, at the retracted position herein, the first and second reflection members may be set at any place in the optical device if they are retracted from the optical path.

BRIEF DESCRIPTION OF THE SEVERAL VIEWS OF THE DRAWING

The accompanying drawings, which are incorporated in and constitute a part of the specification, illustrate embodiments of the present invention, and together with the general description given above and the detailed description of the embodiments given below, serve to explain the principles of the invention.

FIGS. 1A to 1C show layouts of an observation optical system and an image pickup optical system expressing the relationship between the size of a conventional focus detecting range and the size of a sub-mirror, wherein FIG. 1A is a view showing an example of an optical device 10A having a narrow focus detecting range; FIG. 1B is a view showing an example of an optical device 10B having a middle focus detecting range; and FIG. 1C is a view showing an example of an optical device 10C whose focus detecting range is substantially identical to the viewing field (imaging range) of the optical device;

FIGS. 2A to 2C show a first embodiment of the present invention, the figures showing an outline configuration of an optical system in an optical device to which a focus detecting apparatus is applied, wherein FIG. 2A is a view showing the layout during focus detection, FIG. 2B is a view showing the layout during imaging, and FIG. 2C is a view showing another layout during imaging;

FIG. 3 is a view showing a layout example of a diaphragm 80 shown in FIGS. 1A to 1C;

FIGS. 6A and 6B each show a second embodiment of the present invention, the figures showing an outline configuration of an optical system in an optical device to which a focus detecting apparatus is applied, wherein FIG. 6A is view showing the layout during focus detection, and FIG. 6B is a view showing the layout during imaging;

FIG. 11 is a view showing a first configuration example of an optical device in a third embodiment of the present invention;

FIG. 12 is a view showing a second configuration example of the optical device in the third embodiment of the present invention;

DETAILED DESCRIPTION OF THE INVENTION

Hereinafter, embodiments of the present invention will be described with reference to the accompanying drawings.

First Embodiment

Figure 1A:
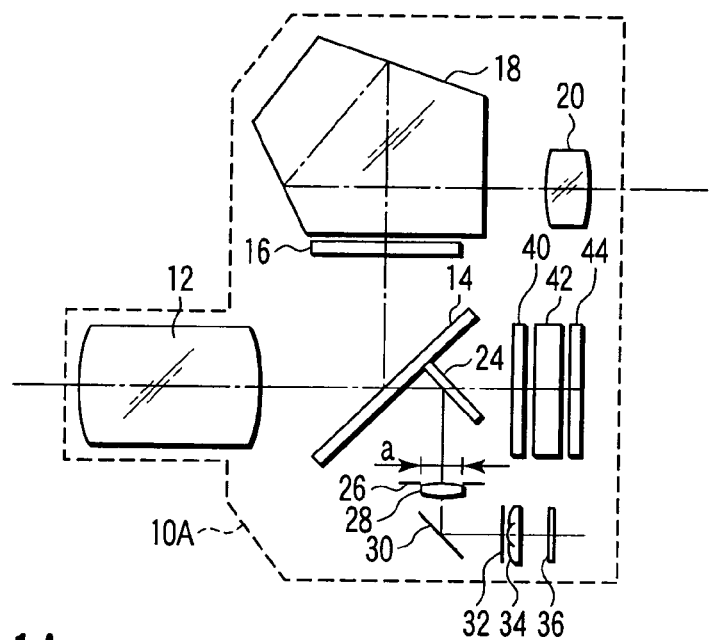
Figure 1B:
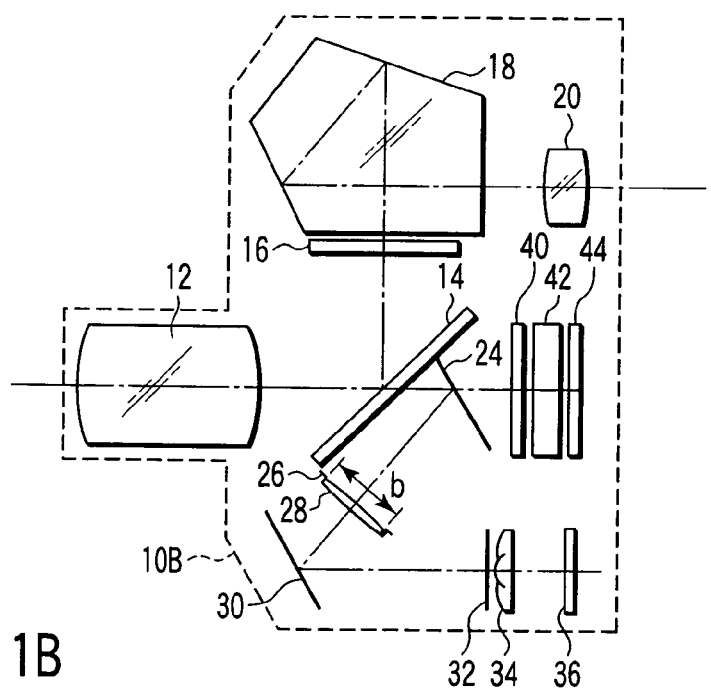
Figure 1C:
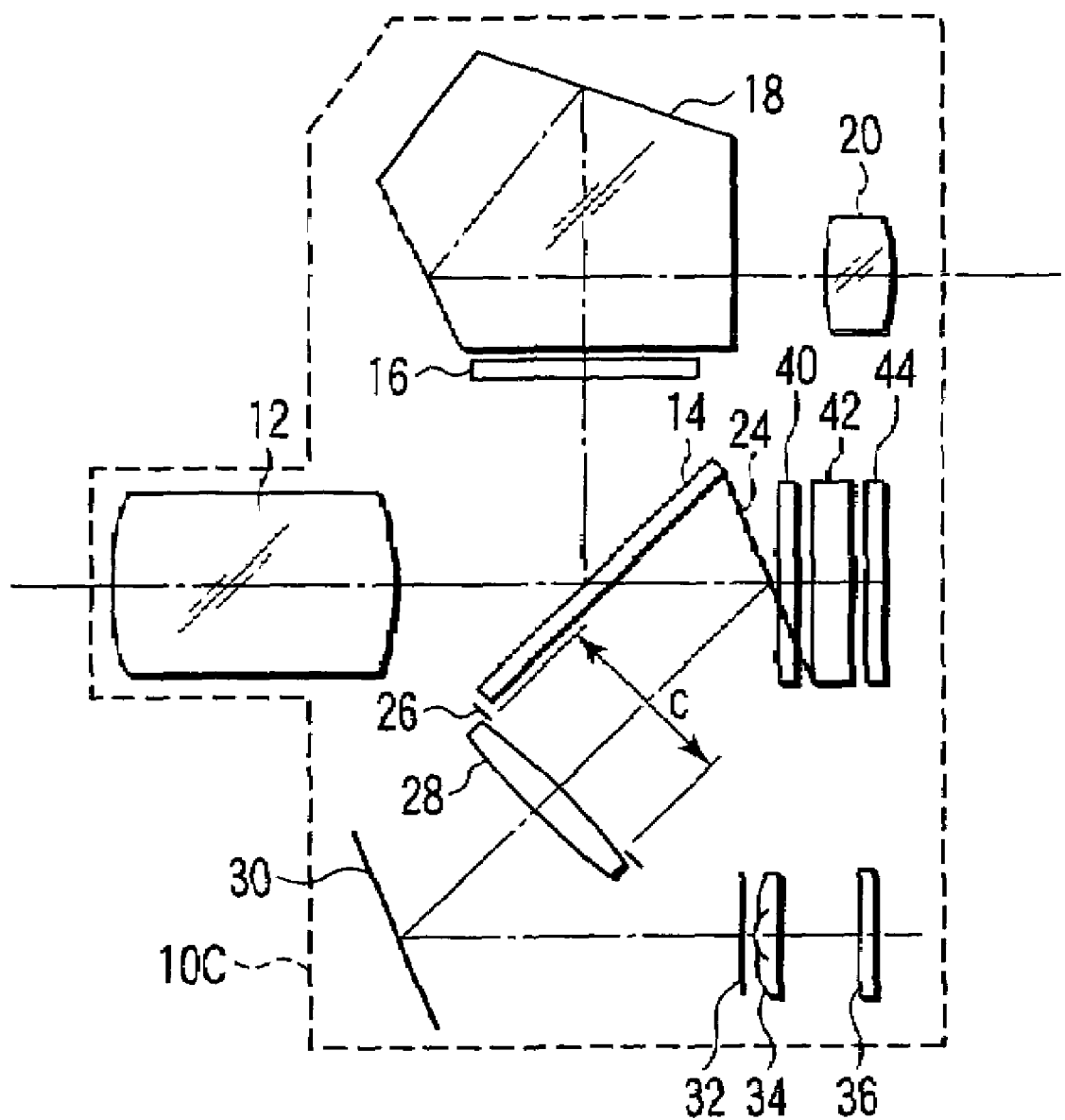
Figure 2A:
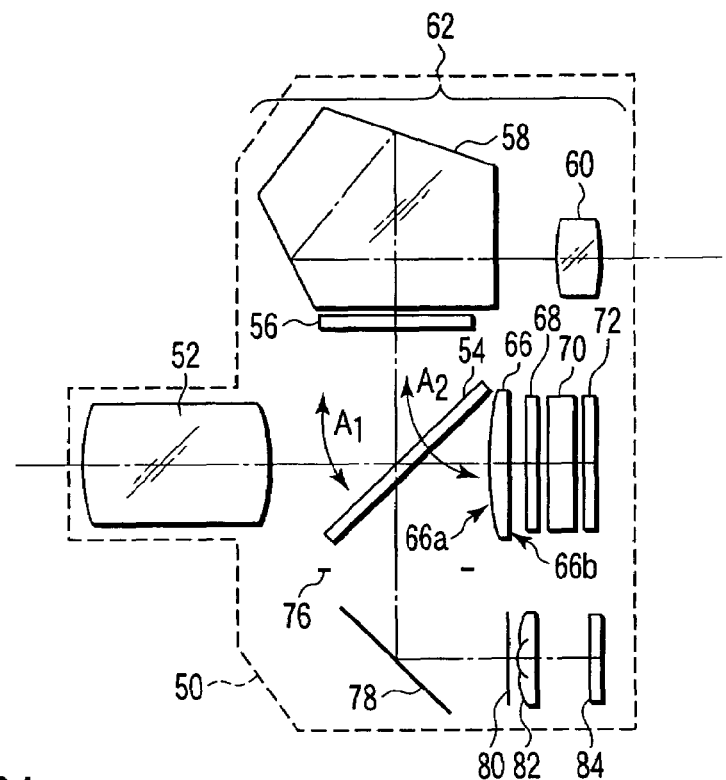
Figure 2B:
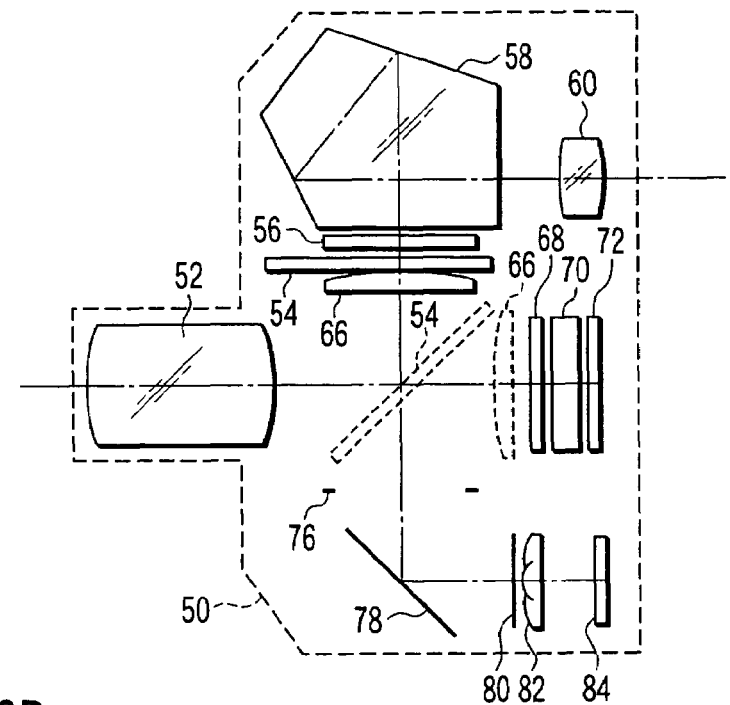

FIGS. 2A and 2B each show a first embodiment of the present invention, the figures showing an outline configuration of an optical system in an optical device to which a focus detecting apparatus is applied, wherein FIG. 2A is a view showing the layout during focus detection, and FIG. 2B is a view showing the layout during imaging;

In FIG. 2A, a camera 50 serving as an optical device comprises an imaging lens 52, a main mirror 52, a focusing glass 56, a pentaprism 58, an eyepiece lens 60, a sub-mirror 66, an infrared filter 68, a low-pass filter 70, an image pickup device 72, a field stop 76, a guide mirror 78, a diaphragm 80, a re-imaging lens (re-imaging optical member) 82, and a photoelectric converter element 84.

The imaging lens 52 is provided as an objective lens to guide a luminous flux from an object (not shown) into the camera 50. On an optical axis of the imaging lens 54, the main mirror 52, the sub-mirror 66, the infrared filter 68, the low-pass filter 70, and the image pickup device 72 are sequentially allocated at the rear of the imaging lens 52 (on the right side in the figure).

The main mirror 54 is movable as a second reflection member in a direction indicated by the arrow Al illustrated, and is composed of a half mirror. In addition, the sub-mirror 66, the infrared filter 68, the low-pass filter 70, and the image pickup device 72 are sequentially allocated at the rear of the main mirror 54 on the imaging optical path. The sub-mirror 66 is movable as a first reflection member in a direction indicated by the arrow $A_2$ illustrated, and is configured to also serve as a condenser lens. Further, the image pickup device 72 is composed of a CCD or CMOS and the like which is a photoelectric converter element for converting an image of an object (not shown) in a photoelectrical manner.

In addition, on a reflection optical axis above the main mirror 54, there are allocated: the focusing glass 56 placed in a distance equivalent to the image pickup device 72, the focusing glass being adopted to focus an incident luminous flux as an optical image; and the pentaprism 58 serving as an image erecting means. Further, the eyepiece lens 60 for a photographer to observe the luminous flux reflected by the pentaprism 58 is provided at the rear of the pentaprism 58. An observation optical system (observation optical means) 62 is composed of the pentaprism 58 and the eyepiece lens 60.

On the other hand, below the main mirror 54, the guide mirror 78 for guiding the luminous flux from an object is allocated on the field stop 76 and the photoelectric converter element 84. On the reflection optical axis of this guide mirror 78, the diaphragm 80 for limiting the luminous flux, the re-imaging lens 82, and the photoelectric converter element 84 are provided to configure the focus detecting apparatus (focus detecting section).

The luminous fluxes reflected by the main mirror 54 are substantially 90°, respectively. Then, the luminous flux oriented from the main mirror 52 to the observation optical system 62 and the luminous flux oriented to the field stop 76 each are reflected in the opposite direction.

The main mirror 54 is allocated to be inclined at 35° to 55°, preferably at substantial by 45° with respect to the image pickup device 72 during focus detection as shown in FIG. 2A. This state indicates a state of observing an object (observation state). At this time, the main mirror 54 is assumed to be set at an observation position. Then, during imaging as shown in FIG. 2B, the main mirror is turned to an angle of 10° or less with respect to the focusing glass 56, preferably up to a substantially parallel position so as to be retracted from the imaging optical path. This state indicates a state in which the main mirror 54 is retracted in order to image an object (a retracted state). At this time, the main mirror 54 is assumed to be set at a retracted position. In addition, a main reflection face of the main mirror 54 is defined as an opposite face to a face against the sub-mirror 66, i.e., a face at the side of the imaging lens 52.

The sub-mirror 66, as described previously, is integrally configured to also serve as a condenser lens and a mirror. That is, this sub-mirror 66 is configured to be a condenser lens having a face 66a at the side of the main mirror 54 to which a luminous flux is incident, the face composed of a convex lens, and to be a mirror having a flat reflection face 66b at the side of the image pickup device 72.

Therefore, the luminous flux incident to the sub-mirror 66 temporarily transmits the face (lens face) 66a of the condenser lens of the sub-mirror 66, and is reflected on the reflection face 66b composed of a flat face. Then, the reflected luminous flux transmits the lens face 66a again so as to be emitted from the sub-mirror 66. The optical axis of this sub-mirror 66 and the optical axis of the imaging lens 52 are substantially coincident with each other (that is, the angle formed between the incident optical axis and the reflection optical axis is zero).

Further, the reflectance of the sub-mirror 66 is assumed to be 92% or more in the range of 400 to 650 nm. It is, of course, preferable that this reflectance be 96% or more in terms of performance. However, the reflectance is assumed to be 92% or more in view of cost efficiency.

In addition, this sub-mirror 66 is movable in a direction indicated by the arrow $A_2$ shown in FIG. 2A, and is allocated (at an observation position) to be substantially parallel to the image pickup device 72 during focus detection. On the other hand, during imaging, the sub-mirror 66, as shown in FIG. 2B, is moved to the vicinity of the focusing glass 56 together with the main mirror 54, and is retracted from the imaging optical path (retracted position).

The pentaprism 58 is provided to align the left and right or top and bottom direction of an image with respect to the luminous flux reflected by the main mirror 54. In this manner, an observer can check an object image by observing the eyepiece lens 60.

Although the pentaprism is used as the image erecting means, the present invention is not limited thereto. For example, reflection means including a porroprism or a roof prism, or alternatively, a prism composed of a mirror instead of these prisms, or a relay optical system and the like, may be used.

In the meantime, it is desirable that the observation optical system 62 have an absolute light quantity for an observer to finally observe the system. Namely, if the reflectance of the main mirror 54 is less then 50%, the observation optical system 62 becomes dark, and an image is hardly observed. In addition, a light beam transmitting the main mirror 54, the light beam being reflected on the reflection face 66b of the sub-mirror 66, and the light beam further transmitting the main mirror 54, becomes a loss. It is not desirable that this loss exceed 25% even if only the characteristics of the main mirror 52 are a cause of this loss. On the other hand, it is not preferable that the reflectance exceed 90% because a light quantity for a focus detecting apparatus is reduced.

Therefore, the reflection of the main mirror 54 used as a half mirror is in the range of 50% to 90%, and preferably, the reflectance is in the range of 70% to 85%. From these facts, if only the characteristics of the half mirror are a cause of a loss, in the case where the reflectance is 70%, the observation optical system 62 is 70%, the focus detecting apparatus is 21%, and a loss of light quantity is 9%. Similarly, in the case where the reflectance of the half mirror is 85%, the observation optical system 62 is 86%, the focus detecting apparatus is 12.75%, and the loss of light quantity is 2.25%.

Figure 4:
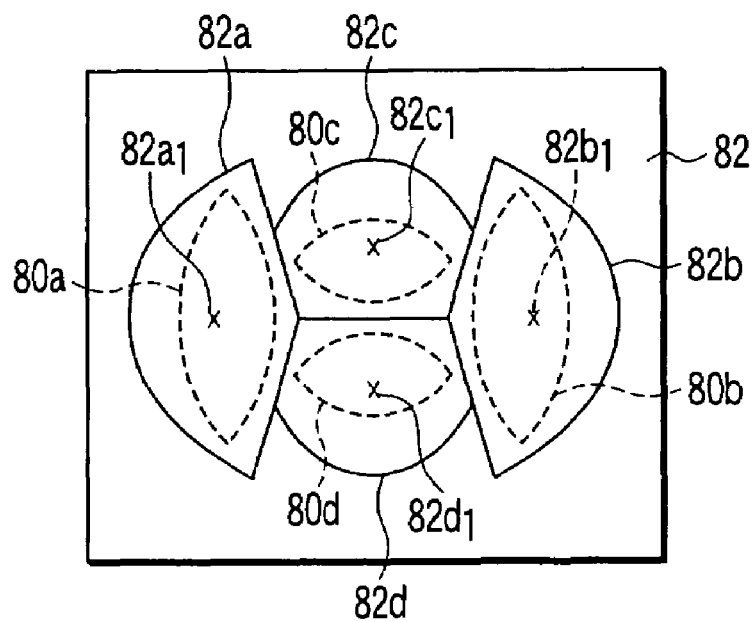
FIG. 4 is a view showing a layout example of a re-imaging lens 82 shown in FIGS. 2A and 2B.

FIGS. 3 and 4 are views showing layout examples of the diaphragm 80 and the re-imaging lens 82, respectively. In the figures, a set of openings and a set of re-imaging lenses are configured, respectively, in a longitudinal direction of an image pickup range and in a direction orthogonal to this longitudinal direction.

That is, as shown in FIG. 3, the diaphragm 80 is formed to have opening sections 80a and 80b, and opening sections 80c and 80d. In addition, in the re-imaging lens 82 shown in FIG. 4, re-imaging lenses 82a and 82b are provided corresponding to the opening sections 80a and 80b, and re-imaging lenses 82c and 82d are provided corresponding to the opening sections 80c and 80d. In FIG. 4, reference numerals $82a_1$, $82b_1$, $82c_1$, $82d_1$ represent apexes of the re-imaging lenses 82a, 82b, 82c, 82d, respectively.

Figure 5:
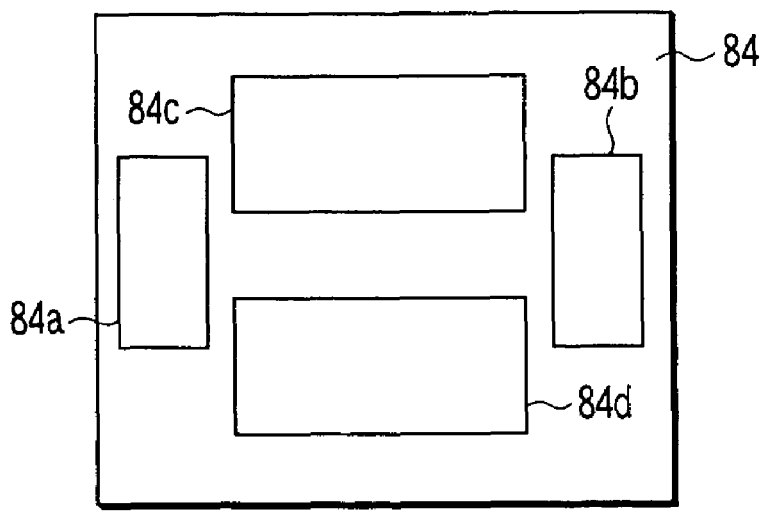
FIG. 5 is a view showing an example of the light receiving range of a photoelectric converter element 84 shown in FIGS. 2A and 2B.

FIG. 5 is a view showing an example of the light receiving range of the photoelectric converter element 84. Light receiving ranges 84a to 84d are allocated corresponding to the opening sections 80a to 80d and the re-imaging lenses 82a to 82d described previously.

In such a configuration, this camera operates as follows.

During focus detection (when the main mirror 54 and the sub-mirror 66 are set at an observation position), as shown in FIG. 2A, a luminous flux from an object (not shown) having passed through a different region of the imaging lens 52, been transmitted by the main mirror 54, and transmitted by the lens face 66a of the sub-mirror 66, is reflected by the reflection face 66b. Then, the luminous flux is transmitted by the lens face 66a again and is reflected by the main mirror 54, and passes through the field stop 76, and is reflected by the guide mirror 78. The luminous flux reflected by this guide mirror 78 passes through the diaphragm 80 which corresponds to the different region of the imaging lens 54, and is guided to the re-imaging lens 82 which corresponds to the diaphragm 80. Then, the guided luminous flux is emitted from the re-imaging lens 82 so as to be incident on the photoelectric converter element 84.

This photoelectric converter element 84 detects a phase difference of an output signal which represents an optical intensity distribution based on a plurality of luminous fluxes having passed through the different regions of the imaging lens 52, respectively. Focus detection is carried out based on the detected phase difference.

In addition, the luminous flux reflected without being transmitted by the main mirror 54 at the same time of the focus detection is guided to the focusing glass 56, making it possible to observe an object image focused here. Further, the luminous flux having passed through the focusing glass 56 is produced as an erected image by the pentaprism 58 so that a photographer can observe the object image through the eyepiece lens 60.

On the other hand, during imaging, as indicated by the arrows $A_1$ and $A_2$ of FIG. 2A, the main mirror 54 and the sub-mirror 66 turn, and are retracted from the imaging optical path (a retracted position), as shown in FIG. 2B. Then, the luminous flux having passed through the imaging lens 54 is guided to the image pickup device 72 via the infrared filter 68 and the low-pass filter 70. In this manner, the object image is picked up by the image pickup device 72; the picked up image is converted in a photoelectric manner; and the converted image is processed as a signal by an image signal processing circuit or the like (not shown).

The imaging lens 54 may be replaceable.

As described above, the luminous flux incident on the optical path of a focus detecting optical system is reflected on the imaging lens 52, the main mirror 54, and the reflection face 66b of the sub-mirror 66; and the reflected luminous flux is reflected by the main mirror 54 and the guide mirror 78. Then, the luminous flux passes through the field stop 80 and a plurality of re-imaging lenses 82 so as to be guided to the photoelectric converter element 84, whereby the sub-mirror 66 becomes compact, and the focus detecting range can be extended to a range which is substantially identical to an imaging range.

It is preferable that the main mirror 54 and the sub-mirror 66 be retracted from the optical path during imaging so that a large quantity of light can be provided to the image pickup device 72 and an element which may cause flare or ghosting such as a half mirror in the imaging optical path can be reduced.

Further, it is preferable that an image caused by small reflection on a face which is not a main reflection face is not superimposed on an image to be observed through the observation optical system 62.

In addition, with such an allocation, the function of a condenser lens of the focus detecting optical system can be provided to the sub-mirror 66 so that the focus detecting optical system can be made compact. In particular, it is preferable that an optical axis of the sub-mirror 66 be set vertically to the image pickup device 72 (parallel to the optical axis of the imaging lens 52), thereby making it possible to reduce generation of distortion of an asymmetrical image in a photoelectric conversion face.

In addition, the observation optical system can be efficiently allocated.

The optical axis or facial shape of the sub-mirror 66 may be configured so as to cancel generation of aberration caused by being transmitted by the main mirror 54 that is a half mirror. In addition, a coating is applied to a face which is not a main reflection face of the main mirror 54 (face against the sub-mirror 66), whereby the focus detecting precision may be improved as a reflection proof effect or a desired reflectance.

Although the reflection face 66b of the sub-mirror 66 has been described to be flat, this reflection face may be curved without being limited thereto. In actuality, a flat convex lens is advantageous in terms of fabrication and assembling. Thus, in the first embodiment, the main mirror 54 and the image pickup device 72 are used to be integrally configured as a convex lens (the lens face 66a) and a flat face (the reflection face 66b), respectively.

Further, in the focus detecting optical system, a low pass effect is provided to superimposition of a face which is not a reflection face on an image caused by small reflection, whereby the precision of focus detection may be increased.

In addition, the image pickup device 72 may be provided as a film for reproducing an image by a chemical change instead of electronic image pickup device such as CCD or CMOS described previously.

Second Embodiment

Now, a second embodiment of the present invention will be described here.

Figure 6A:
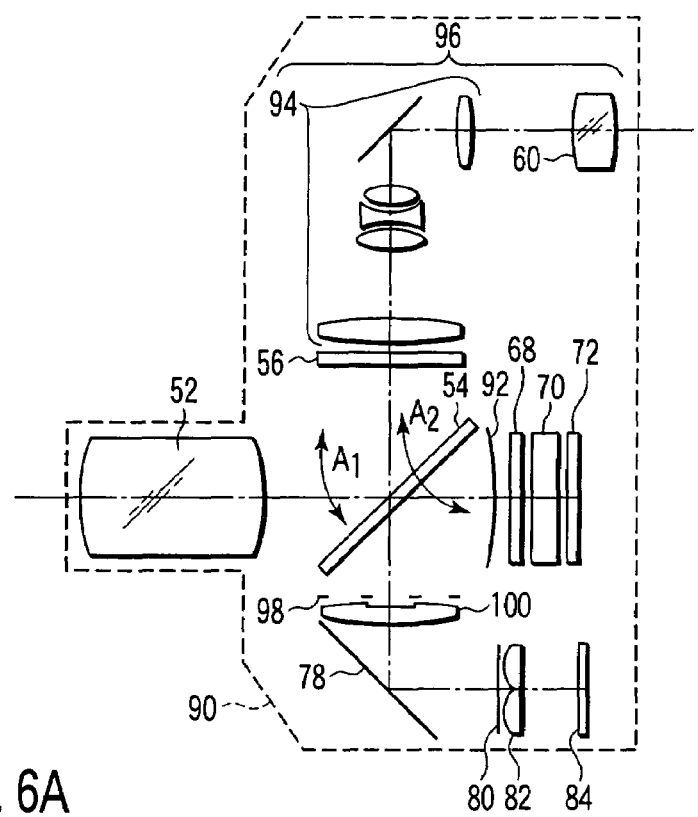
Figure 6B:
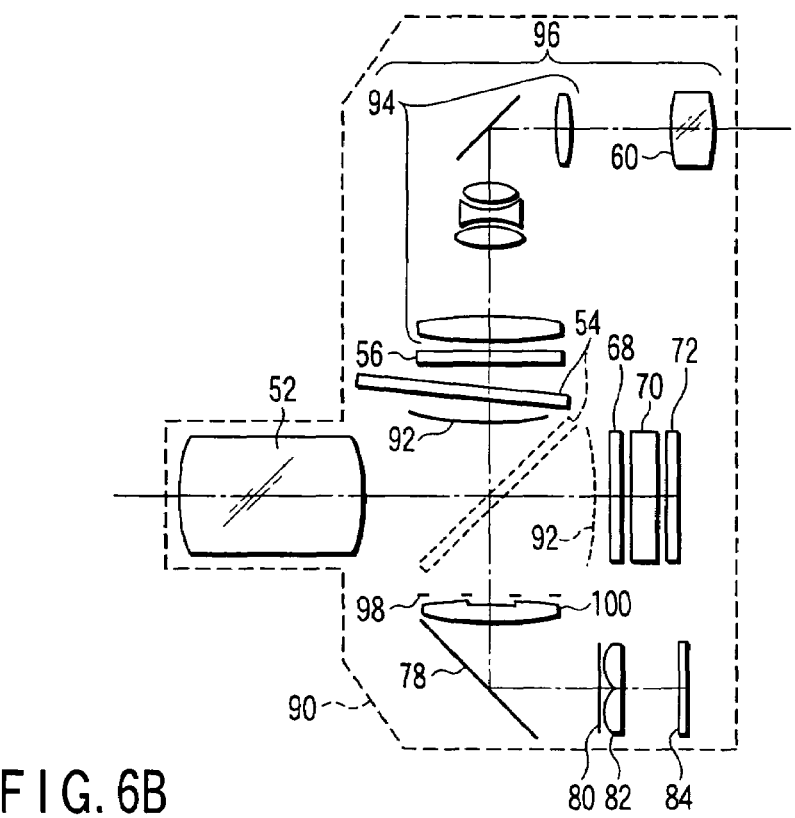

FIGS. 6A and 6B each show the second embodiment of the invention, the figures showing an outline configuration of an optical system in an optical device to which a focus detecting apparatus is applied, wherein FIG. 6A is view showing a layout during focus detection, and FIG. 6B is a view showing a layout during imaging.

In the second embodiment, a configuration of a camera serving as an optical device is basically identical to those shown in FIGS. 2 to 5. The same constituent elements are designated by the same reference numerals. An illustration and a description will not be repeated here. Only different constituent elements and operation will be described here.

In a camera 90 shown in FIG. 6A, on an optical axis of an imaging lens 52, at the rear of the imaging lens (on the right in the figure), there are allocated: a main mirror 54 which is movable in a direction indicated by the arrow $A_1$ illustrated, and which is composed of a half mirror; a sub-mirror 92 which is movable in a direction indicated by the arrow $A_2$ illustrated and which also serves as a first condenser lens; a infrared filter 68; a low-pass filter 70; and an image pickup device 72 such as a CCD which is a photoelectric converter element for converting an object image in a photoelectrical manner.

In addition, on a reflection optical axis which is placed above the main mirror 54, there are allocated: a focusing glass 56 placed in a distance equivalent to the image pickup device 72, the focusing glass being adopted to focus an incident luminous flux as an optical image; a relay optical system 94 which is an image erecting means having a plurality of lenses and mirrors to which the luminous flux passing through the focusing glass 56 is incident; and an observation optical system (observation optical means) 96 including an eyepiece lens 60.

On the other hand, below the main mirror 54, there are provided: a field stop 98 having a plurality of openings which is placed in the vicinity of a position equivalent to the image pickup device 72; a second condenser lens 100 having an optical axis which corresponds to each opening of the field stop 98; a guide mirror 78; a diaphragm 80 for limiting luminous flux; a re-imaging lens 82; and a photoelectric converter element 84.

The sub-mirror 92, as in the sub-mirror 66 described previously, is configured to also serve as with the first condenser lens. Thus the sub-mirror is formed in a concave shape relative to the incident luminous flux and has a reflection face inside of the concave. That is, the sub-mirror is configured like a concave mirror. During imaging, this sub-mirror is retracted from an imaging optical path together with the main mirror 54 (refer to FIG. 6B).

An optical axis of the sub-mirror 92 and an optical axis of the imaging lens 52 are substantially coincident with each other (the angle formed between the incident optical axis and the reflection optical axis is zero).

Figure 7:
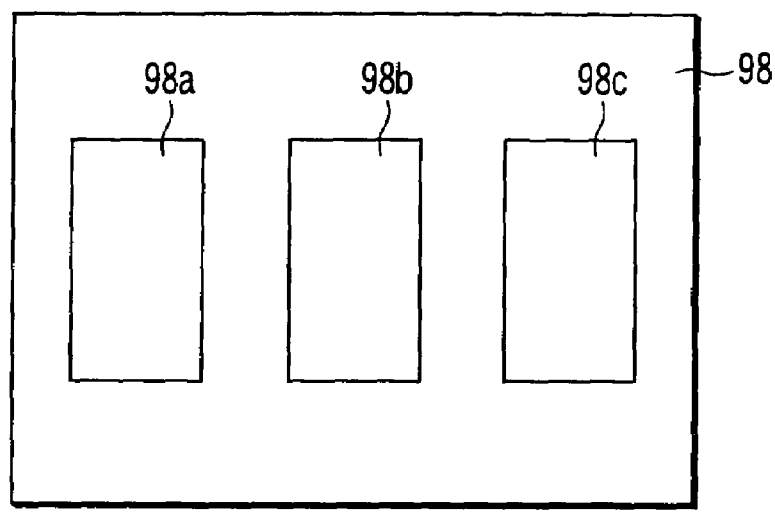
FIG. 7 is a view showing a layout example of a field stop 98 shown in FIGS. 6A and 6B.
Figure 8:
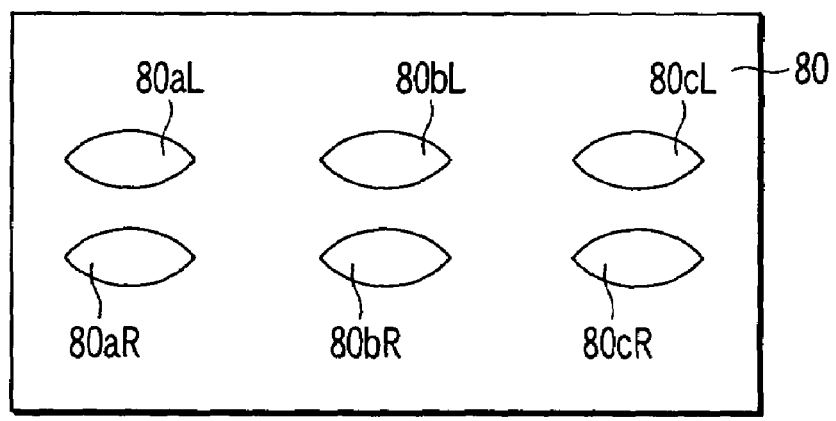
FIG. 8 is a view showing a layout example of a diaphragm 80 shown in FIGS. 6A and 6B.
Figure 9:
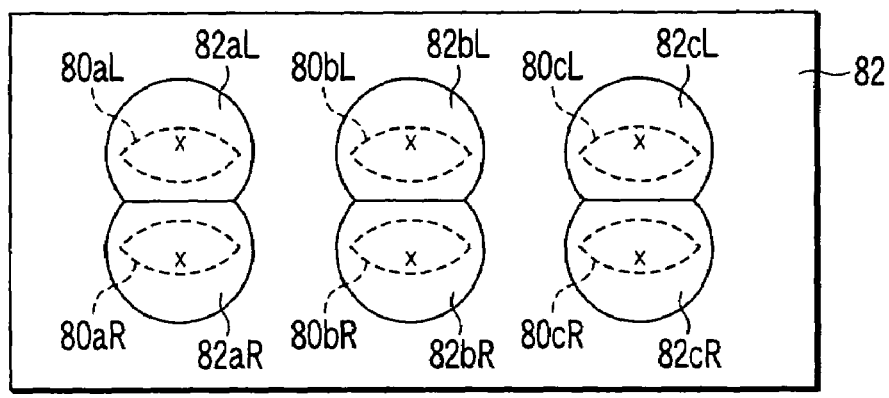
FIG. 9 is a view showing a layout example of a re-imaging lens 82 shown in FIGS. 6A and 6B.
Figure 10:
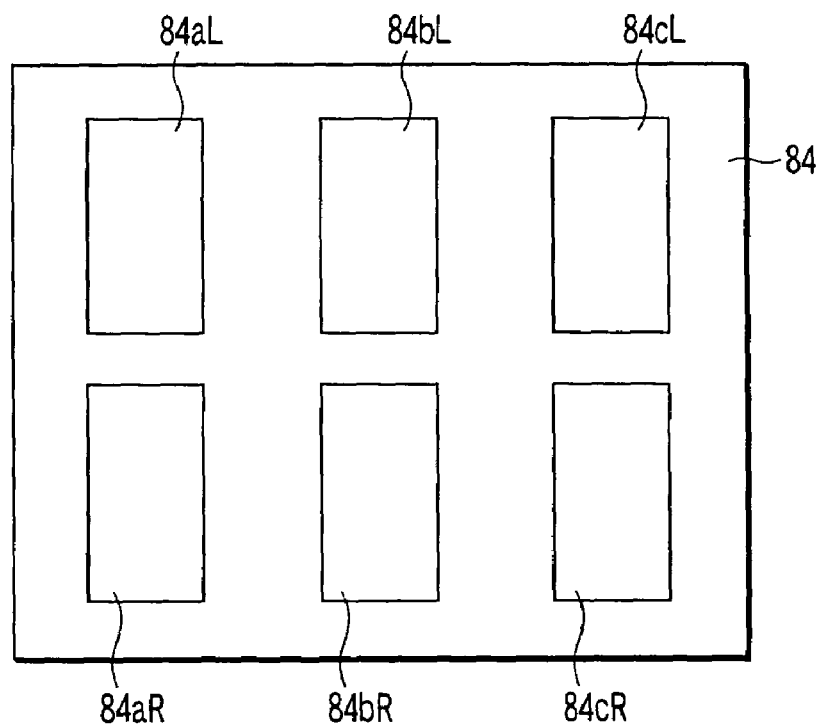
FIG. 10 is a view showing an example of the light receiving range of a photoelectric converter element 84.

FIG. 7 is a view showing a layout example of the field stop 98; FIGS. 8 and 9 are views showing layout examples of the diaphragm 80 and the re-imaging lens 82, respectively; and FIG. 10 is a view showing an example of a light receiving range of the photoelectric converter element 84. In the figures, the image pickup range is divided into an opening 98b at the center of a screen and openings 98a, 98c at the left and right of the screen by the field stop 98.

The luminous flux having passed through the opening 98a of the field stop 98 is guided to a light receiving range 84aL via a diaphragm 80aL and a re-imaging lens 82aL, and is guided to a light receiving range 84aR via a diaphragm 80aR and an image focusing lens 82aR. Similarly, the luminous flux having passed through the opening 98b of the field stop 98 is guided to a light receiving range 84bL via a diaphragm 80bL and a re-imaging lens 82bL, and is guided to a light receiving range 84bR via a diaphragm 80bR a re-imaging lens 82bR. Then, the luminous flux having passed through the opening 98c of the field stop 98 is guided to a light receiving range 84cL via a diaphragm 80cL and a re-imaging lens 82cL, and is guided to a light receiving range 84cR via a diaphragm 80cR and a re-imaging lens 82cR.

In such a configuration, this camera 90 operates as follows.

During focus detection, as shown in FIG. 6A, a luminous flux from an object (not shown) having passed through a different region of the imaging lens 52, transmits the main mirror 54, and is reflected by a reflection face of the sub-mirror 92. Then, the reflected luminous flux is reflected by the main mirror 54 and passes through the field stop 98. Then, the luminous flux passes through the second condenser lens 100 having an optical axis which corresponds to each of the openings 98a to 98c in the field stop 98, and is reflected by the guide mirror 78.

The luminous flux reflected by this guide mirror 78 passes through the diaphragms 80aL, 80aR to 80cL, 80cR having a plurality of openings which corresponds to different regions of the imaging lens 52, and is guided to the re-imaging lenses 82aL, 82aR to 82cL, 82cR which correspond to the diaphragm 80. Then, the luminous flux emitted from the re-imaging lenses 82aL, 82aR to 82cL, 82cR is incident to each of the light receiving ranges 84aL, 84aR to 84cL, 84cR of the photoelectric converter element 84.

This photoelectric converter element 84 detects a phase difference of an output signal which represents an optical intensity distribution caused by a plurality of luminous fluxes having passed different regions of the imaging lens 52, respectively. Focus detection is carried out based on the detected phase difference.

In addition, at the same time of the focus detection, the luminous flux reflected without transmitting the main mirror 54 is guided to the focusing glass 56, making it possible to observe an object image focused here. Further, the luminous flux having passed the focusing glass 56 is guided to the eyepiece lens 60 via a relay optical system 94. In this manner, a photographer can observe the object image.

On the other hand, during imaging, as indicated by the arrows $A_1$ and $A_2$ of FIG. 6A, the main mirror 54 and the sub-mirror 92 turn, and are retracted from the imaging optical path, as shown in FIG. 6B. Then, the luminous flux having passed through the imaging lens 52 is guided to the image pickup device 72 via the infrared filter 68 and the low-pass filter 70. In this manner, an object image is picked up by the image pickup device 72; the picked up object image is converted in a photoelectrical manner; and the converted object image is processed as a signal by an image signal processing circuit or the like (not shown).

The imaging lens 52 may be replaceable.

As described above, according to the second embodiment, an advantageous effect similar to that in the first embodiment described previously can be attained.

In addition, in the second embodiment, a concave mirror is used as the sub-mirror 92 relevant to the function of a lens element, thus making it possible to reduce the weight by integrating the lens element function and the mirror function with each other.

Third Embodiment

Now, a third embodiment of the present invention will be described here.

The third embodiment is different from the first embodiment shown in FIGS. 2A to 5 in terms of the shape of a sub-mirror.

The configuration of a camera serving as an optical device in the third embodiment is basically identical to that shown in FIGS. 2A to 5. The same constituent elements are designated by the same reference numerals. An illustration and a description will not be repeated here. Only different constituent elements and operation will be described here.

FIG. 11 is a view showing a first configuration example of a camera serving as an optical device in the third embodiment. A camera 110 according to the first configuration example of the present embodiment employs a sub-mirror 112 instead of the sub-mirror 66 used in the first embodiment described previously. This sub-mirror 112 is provided as a double-sided convex lens, wherein a main mirror 54 side is formed as a transmission face 112a, and an image pickup device 72 side is formed as a reflection face 112b. Other constituent elements are similar to those in the embodiments described previously.

FIG. 12 is a view showing a second example of a camera serving as an optical device in the third embodiment of the invention. A camera 120 according to the second configuration example employs a flat mirror 122 instead of the sub-mirror 66 in the first embodiment described previously. In this case, in the vicinity of a field stop 76, a condenser lens 124 is allocated between the field stop 76 and a guide mirror 78. Other constituent elements are similar to those in the embodiments described previously.

As described above, even if the shape of the sub-mirror is changed, an advantageous effect similar to that in the embodiments described previously can be attained.

Apart from the first and second configuration examples described previously, for example, a lens for carrying out a first condenser lens function is provided on the sub-mirror, whereby an optical element which functions as a second condenser lens may be allocated in the vicinity of the field stop.

Fourth Embodiment

Now, a fourth embodiment of the present invention will be described here.

The fourth embodiment is different from the second embodiment shown in FIGS. 6A to 10 in terms of the shape of a sub-mirror and an optical element that is a second condenser lens.

The configuration of an optical device in the fourth embodiment is basically identical to those shown in FIGS. 2A to 10. The same constituent elements are designated by the same reference numerals. An illustration and a description will not be repeated here. Only different constituent elements and operation will be described here.

Figure 13:
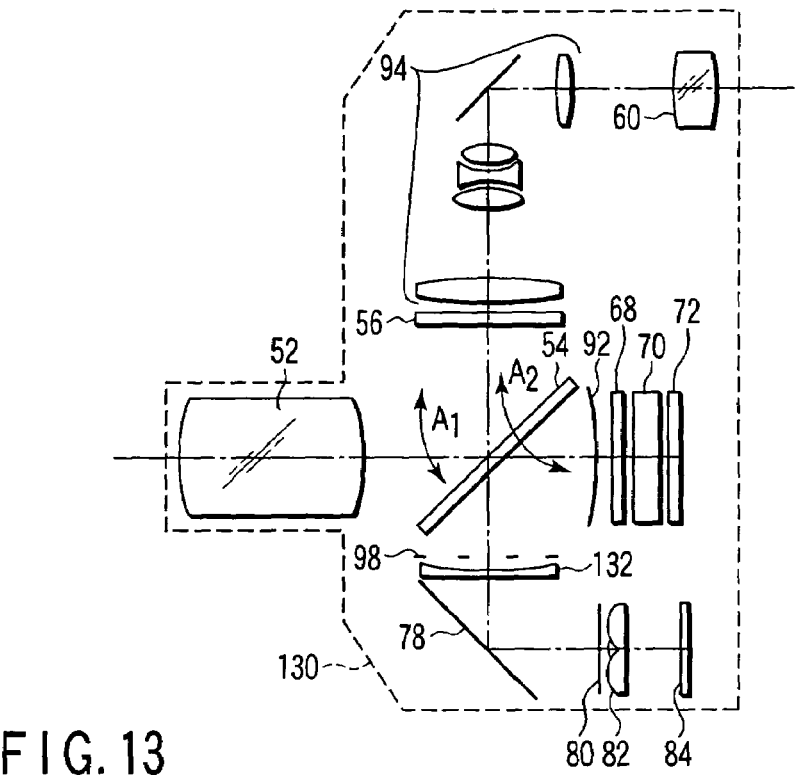
FIG. 13 is a view showing a first configuration example of an optical device in a fourth embodiment of the present invention.

FIG. 13 is a view showing a first configuration example of a camera serving as an optical device in the fourth embodiment of the invention. In the optical device according to the first configuration example, in the second embodiment described previously, a prism 132 is allocated in the vicinity of a field stop 98 and between the field stop and a guide mirror 78. This prism 132 is provided to bend an optical path having passed each one of the openings of the field stop 98 in a different direction. Other constituent elements are similar to those in the embodiments described previously.

Figure 14:
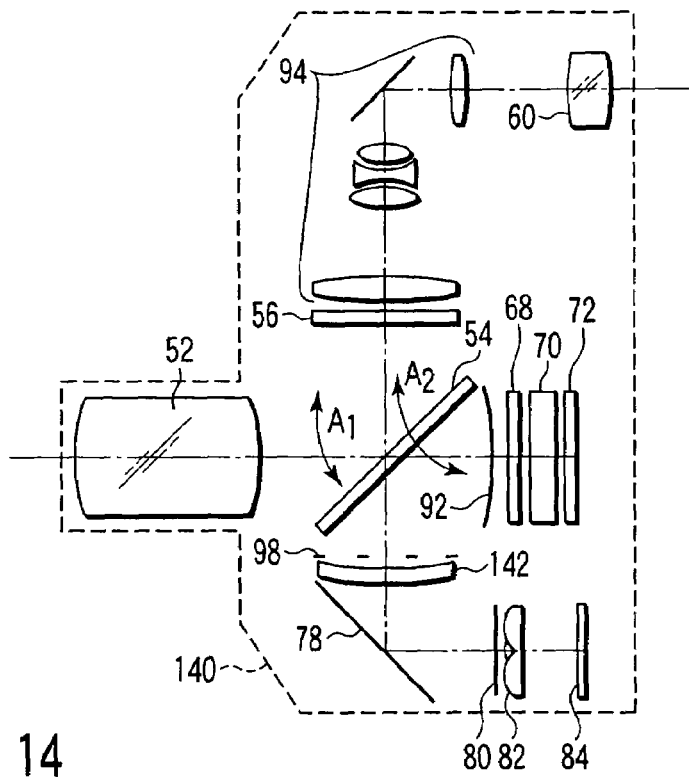
FIG. 14 is a view showing a second configuration example of the optical device in the fourth embodiment of the present invention.

FIG. 14 is a view showing a second configuration example of a camera serving as an optical device in the fourth embodiment of the invention. In a camera 140 according to the second configuration example, an optical element 142 is employed instead of the prism 132 in the first configuration example shown in FIG. 13. This optical element 142 is allocated between the field stop 98 and the guide mirror 78, where the field stop 98 side is used as a prism, and a face at the guide mirror 78 side is formed as a face having a curvature. Other constituent elements are similar to those in the embodiments described previously.

As described above, even if the shape of the sub-mirror is changed or a prism is used instead of the second condenser lens, an advantageous effect similar to that in the embodiments described previously can be attained.

In the first to fourth embodiments described previously, an image erecting means or a sub-mirror and an optical element that is a second condenser lens can be, of course, combined variously without being limited to the constituent elements described previously.

In addition, although an example in which a pentaprism or a relay optical system is used as image erecting means has been described, for example, reflection means including a porroprism or a roof prism, or alternatively, an optical system and the like composed of a plurality of mirrors instead of these prisms may be used without being limited thereto.

Further, in the first to fourth embodiments, although the sub-mirror is moved in the vicinity of a focusing glass together with a main mirror during imaging at a retracted position, the present invention is not limited thereto. For example, the main mirror and the sub-mirror may be rotated in different directions as is illustrated in FIG. 2C. That is, the main mirror and the sub-mirror may be placed in a state in which they are retracted from the optical path, and thus, both of these mirrors may be set at mutually different places or approximately the same place in an optical device.

Although the embodiments of the present invention have been described, according to the present invention, various modifications can occur without departing from the spirit of the invention.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. A focus detecting apparatus which acquires an optical intensity distribution caused by a plurality of luminous fluxes passed through different regions of an objective lens at a photoelectric converter section, and detects a phase difference of an output signal which represents the acquired optical intensity distribution to carry out focus detection, the apparatus comprising:
   a first reflection member which reflects luminous fluxes passed through the different regions of the objective lens, respectively;
   a second reflection member which reflects the luminous fluxes each reflected by the first reflection member in a direction which is different from an incident direction of the luminous fluxes; and
   a re-imaging optical member which guides the luminous fluxes reflected by the second reflection member to the photoelectric converter section;
   wherein the second reflection member includes a half mirror which transmits the luminous fluxes from the objective lens and reflects the luminous fluxes from the first reflection member.

2. The focus detecting apparatus according to claim 1, wherein the second reflection member is composed of a half mirror whose reflectance is in the range of 50% to 90%.

3. The focus detecting apparatus according to claim 1, wherein the first reflection member is provided as an optical element such that a transmission face which transmits the luminous fluxes from the objective lens and a reflection face which reflects the luminous fluxes transmitted through the transmission face are formed integrally.

4. The focus detecting apparatus according to claim 3, wherein the transmission face of the first reflection member is composed of a convex lens face.

5. The focus detecting apparatus according to claim 3, wherein the reflection face of the first reflection member is composed of a flat face.

6. The focus detecting apparatus according to claim 3, wherein the reflection face of the first reflection member is composed of a concave mirror.

7. An optical device comprising:
   an objective lens which guides a luminous flux from an object;
   a first reflection member movably supported at an observation position obtained as a state of observing the object and at a retracted position obtained as a state retracted from an optical path, the first reflection member reflecting a luminous flux from the objective lens;
   a second reflection member which is movably supported at the observation position and the retracted position, and reflects a part of the luminous flux from the objective lens in a first direction and transmits the luminous flux to the first reflection member when the reflection members are set at the observation position, and reflects the luminous flux reflected by the first reflection member in a second direction which is different from the first direction;
   an observation optical system to observe the object by using the part of the luminous flux from the objective lens reflected by the second reflection member; and
   a focus detecting section which acquires an optical intensity distribution based on the luminous flux reflected by the second reflection member and detects a phase difference of an output signal which represents the optical intensity distribution to carry out focus detection.

8. The optical device according to claim 7, further comprising an image pickup device which, when the first reflection member and the second reflection member are set at the retracted position, receives the luminous flux from the objective lens to obtain object information.

9. The optical device according to claim 8, wherein the second reflection member is composed of a half mirror.

10. The optical device according to claim 9, wherein the second reflection member is provided as a half mirror whose reflectance is in the range of 50% to 90%.

11. The optical device according to claim 9, wherein the first reflection member is provided as an optical element such that a transmission face which transmits the luminous flux from the objective lens and a reflection face which reflects the luminous flux transmitted through the transmission face are formed integrally.

12. The optical device according to claim 9, wherein the transmission face of the first reflection member is composed of a convex lens face.

13. The optical device according to claim 9, wherein the reflection face of the first reflection member is composed of a flat face.

14. The optical device according to claim 13, wherein the reflection face of the first reflection member is composed of a curved face.

15. The optical device according to claim 9, wherein the reflection face of the first reflection member is composed of a concave mirror.

16. The optical device according to claim 9, wherein the second reflection member has a main reflection face formed at an opposite side to the first reflection member.

17. The optical device according to claim 7, wherein the first direction and the second direction of the luminous fluxes reflected by the second reflection member are opposite to each other.

18. The optical device according to claim 7, wherein the first reflection member and the second reflection member rotate in substantially the same direction, when the reflection members are moved to the retracted position.

19. The optical device according to claim 7, wherein the first reflection member and the second reflection member rotate in different directions, when the reflection members are moved to the retracted position.

* * * * *